No. 646,652. Patented Apr. 3, 1900.
M. T. B. WASHINGTON.
GEARING.
(Application filed Mar. 5, 1897.)

(No Model.)

Witnesses:
C. H. Crawford
Edward J. Brown

Inventor:
Madison T. B. Washington
by Poole & Brown
his Attorneys

THE NORRIS PETERS CO., PHOTO-LITHO., WASHINGTON, D. C.

UNITED STATES PATENT OFFICE.

MADISON T. B. WASHINGTON, OF CHICAGO, ILLINOIS.

GEARING.

SPECIFICATION forming part of Letters Patent No. 646,652, dated April 3, 1900.

Application filed March 5, 1897. Serial No. 626,011. (No model.)

*To all whom it may concern:*

Be it known that I, MADISON T. B. WASHINGTON, a citizen of the United States, residing in Chicago, in the county of Cook and State of Illinois, have invented a new and useful Improvement in Gearing, of which the following is a specification.

This invention relates to improvements in driving-wheels of that class in which the rim and spokes are made separate from each other and are attached to each other in a manner permitting relative movement of the rim to the spokes.

The invention is herein shown as applied to the sprocket-wheel of a bicycle; but it may be used in other connections wherever such form of wheel is desirable.

Figure 1:
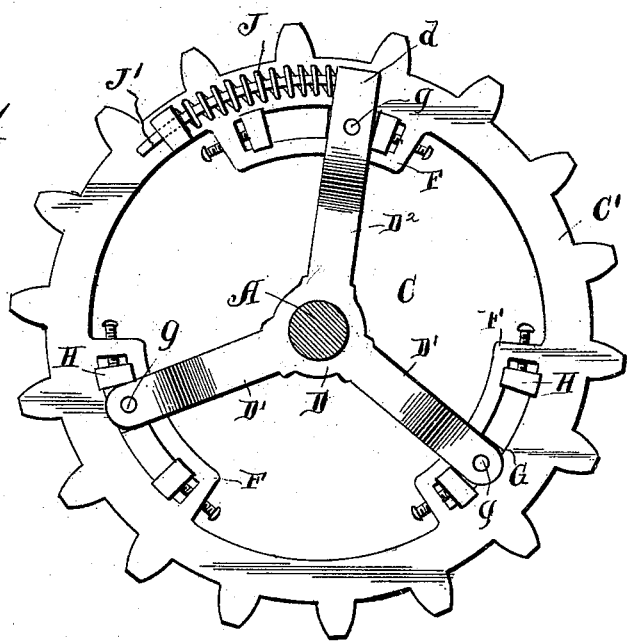
Figure 2:
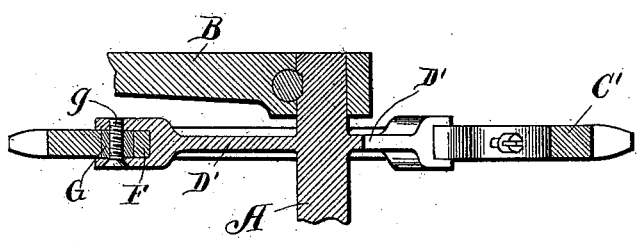

As shown in the drawings, Figure 1 is a side elevation of a sprocket-wheel made in accordance with my invention. Fig. 2 is a section taken through the axis of the wheel.

As shown in said drawings, A represents the crank-shaft of a bicycle or like machine, and B one of the pedal-cranks, which is attached to said shaft.

C designates a sprocket-wheel comprising a continuous annular rim C', which is provided with peripheral sprocket-teeth $c$, which are adapted for engagement with the sprocket-driving belt or chain, a central hub D, and radiating spokes or arms D' D², which extend between the hub and the rim. Said rim is made separate from said spokes and is attached thereto by means permitting limited movement of the rim with respect to the spokes. As herein shown, three spokes are provided, and the rim is provided at its interior margin with three arc-shaped loops F, one at the end of each spoke. Said loops are shown as made integral with the rim. The outer ends of the spokes D' D² are provided with fork-arms, as shown in Fig. 2, which arms overlap the said loops F. Between said arms of each spoke is interposed a bearing-block G, which is attached to said arms by means of a pin $g$ passing therethrough. Said blocks engage at their inner edges the loops F and at their outer edges the interior margin of the rim and are made of such size as to slide freely between said loops and rim, but at the same time prevent movement of the spokes in the direction of their length. Said blocks may be made of other form than that herein shown. At one or both ends of the loops is located an adjustable stop H, which is movable toward and from the end of the loop. One stop at each end, as herein shown, is provided. The means for moving said stops with respect to the loops consists of screws I, which have screw-threaded engagement with the end portions of the loops and engage the adjacent faces of said stops. Said stops are adapted to be moved toward and from the ends of the loops to vary the relative movement of the rim to the spokes. In Fig. 1 the spokes D' D² are shown intermediate their limits of movement and out of engagement with said stops; but it will be understood that when the wheel is in use each of said spokes will be engaged with the stop at one end of its loop. A spring J is applied to the outer end of one of the spokes in a manner to normally hold it in engagement with that one of the stops H with which it is in contact when the wheel is in use. As herein shown, the spoke D² is provided at its outer end with a lug $d$, and said spring is interposed between said lug and a lug $c'$ on the wheel-rim. Said spring is of spiral form and is held in place by means of a curved guide-rod J', which it encircles, said guide-rod being connected with the outer end of the spoke and having sliding engagement with a suitable-shaped aperture in the lug $c'$. With this construction when force is exerted to stop the rotation of the wheel, as by back-pedaling when the wheel is the sprocket-wheel of a bicycle, the relative movement of the rim to the spokes will be slower than if such spring were absent and the impact of the sliding blocks G against the stops H will not be so abrupt. The strength of the spring will be proportioned to the weight or strength of the rider. Said spring, as before stated, serves to normally hold the spokes in engagement with the stops at the forward ends of the loops, and when relative movement of the spokes and rims brings said spokes in contact with the stops at the rear ends of the loops, as occurs when back-pedaling, the spring is put under tension, so that when pressure on the crank-shaft is released it acts to restore said spokes to their normal positions. This occurs when the crank is passing through the upper part of its circumferential path, so that when it reaches a position in which pressure is applied to propel the machine the wheel will be in condition for effective application of power.

The construction described is an advantageous one when embodied in a sprocket-wheel for bicycles for several reasons. For instance, when the rider is moving at a relatively-high rate of speed and power is applied to check the movement of the wheel by back-pedaling such power acts for a time to stop the movement of the crank-shaft and the inner part of the wheel, which consists of the hub and spokes. The rim of the wheel will, however, continue its movement until arrested by impact of the stops H with the spokes. By reason of the presence of the spring between the spoke and rim such movement of the rim will be gradually slowed and the abruptness of the impact of the stops against the spokes considerably lessened. The impact of said stops against the spokes will, moreover, check the movement the wheel, so that the rider may within a comparatively short time have perfect control of the wheel. Furthermore, at the time the stops on the rim strike the spokes there is a very perceptible check in the movement of the wheel, which, if opportunely taken advantage of by the rider, will enable him to safely dismount even when going at a relatively high rate of speed. The safety of the rider is therefore increased, as he is enabled to more quickly stop his wheel or dismount therefrom in time of danger and when moving at a high rate of speed.

A further advantage of the construction described is that when the rider dismounts from the pedal when going at a moderate rate of speed his weight is not brought so abruptly on the chain as in the prevailing construction of bicycle sprocket-wheels. Moreover, the strain brought upon the chain when back-pedaling is considerably lessened by reason of the yielding construction of the wheel.

I claim as my invention—

1. In a wheel, the combination with a rim, and a central support which is made separate from and has rotative movement relatively to the rim, of a curved guide between the rim and support which forms a part of the connection between said parts, the relative movement of said parts in one direction being positively limited and in the other direction being yieldingly permitted by means which normally hold the parts in positive engagement.

2. In a wheel, the combination with a rim, and a central support which is made separate from the rim, of a curved guide between the rim and support which constitutes a part of the connections between said parts, shoulders on one of said parts positively limiting the movement of the support relatively to the rim in one direction, and a spring applied to normally maintain said shoulders in contact with opposing shoulders on the other part but which permits one of the parts to yield with respect to the other.

3. In a wheel the combination with a rim, and a central support which is made separate from said rim and connected therewith by means permitting movement of the rim with respect to the support, and a rigid shoulder on the rim, which has contact with the support on one side thereof, and which positively limits such relative movement in one direction, of a spring which acts to normally hold said support in contact with said rigid shoulder.

4. In a wheel, the combination with a rim, a central hub, and a plurality of spokes extending from said hub to the rim, said spokes being connected with the rim in a manner permitting the rim to move circumferentially thereof with respect to the spokes, rigid stops on one of the parts limiting the movement of the rim in one direction with respect to the spokes, a lug on the end of one of said spokes, a shoulder on the rim, and a spiral spring interposed between said lug and shoulder.

5. In a wheel, the combination with a rim, a hub, and a plurality of spokes which are made separate from the rim, of a plurality of arc-shaped loops which are engaged by parts carried by said spokes, and a spring interposed between one of said spokes and a shoulder on the rim.

6. In a wheel, the combination with a rim, a hub and a plurality of spokes which are made separate from the rim, of a plurality of arc-shaped loops on the internal margin of the rim which are engaged by parts carried by said spokes, a spiral spring interposed between the outer end of one of said spokes and a lug on the rim, and a guide-rod which is connected with said spoke and has sliding engagement with said lug.

7. In a wheel, the combination with a rim, a hub, and a plurality of spokes which are made separate from the rim, and a plurality of arc-shaped loops on the internal margin of said rim, and parts carried by the outer ends of said spokes which engage said loops and radially fill the space between the same and the inner margin of the rim.

8. In a wheel, the combination with a rim, a hub and a plurality of spokes which are made separate from said rim, of a plurality of arc-shaped loops on the internal margin of said rim, parts carried by the outer ends of said spokes which engage said loops, and an adjustable stop at the end of each loop adapted to limit the movement of the rim with respect to the spokes.

9. In a wheel, the combination with a rim, a hub, and a plurality of spokes which are made separate from said rim, of a plurality of arc-shaped loops on the internal margin of the rim, parts carried by the outer ends of said spokes which engage said loops, and an adjustable stop at the end of each loop adapted to limit the movement of the rim with respect to the spokes, each comprising a block interposed between said loop and the rim, and an adjusting-screw passing through said loop and engaging said block.

10. In a wheel, the combination with a rim, a hub, and a plurality of spokes which are separate from said rim, of a plurality of arc-shaped loops on the internal margin of the rim, a fork-arm on the outer end of each of said spokes which overlaps the opposite sides of the loop, and a bearing member between said fork-arms which is adapted for engagement with said loop, said bearing member radially filling the space between the loop and the rim whereby radial movement of the spoke with respect to the rim is prevented.

11. The combination with a crank-shaft, of a sprocket-wheel comprising a central hub, a rim having marginal sprocket-teeth and spokes extending from said hub to the rim, said spokes being forked at the ends and the forked ends extending on opposite sides of the rim, stops on said rim for limiting the movement of the rim with respect to the spokes, one of the arms on one of said spokes being extended to form a lug, a lug on the rim adjacent thereto, and a spring interposed between said lug on the spoke and lug on the rim.

MADISON T. B. WASHINGTON.

Witnesses:
H. M. MUNDAY,
O. P. KIRKWOOD.